Figure 1:
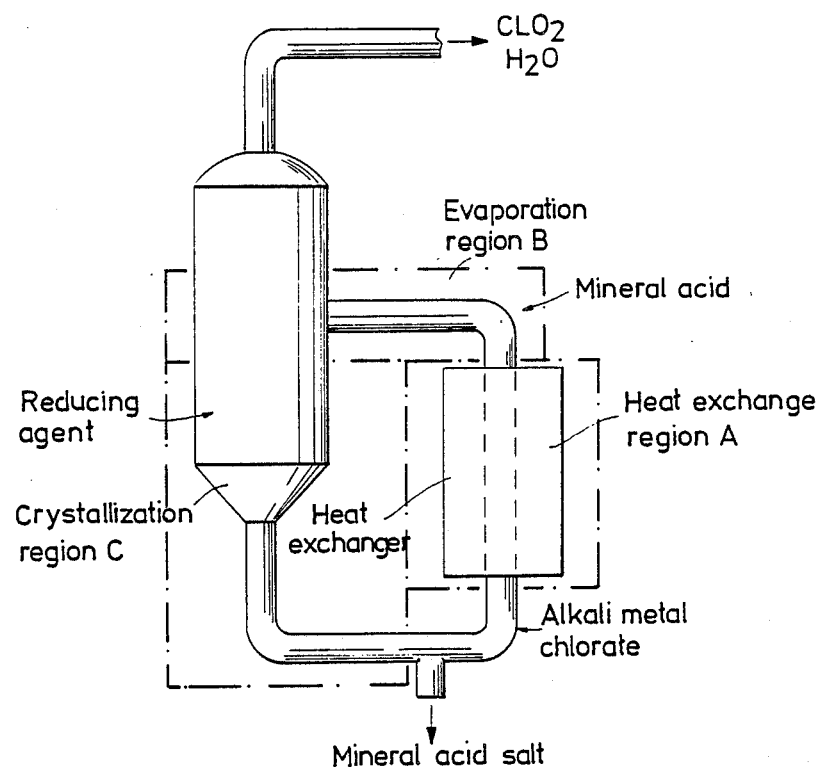

United States Patent [19]

Norell

[11] Patent Number: 4,770,868

[45] Date of Patent: Sep. 13, 1988

[54] PROCESS FOR PRODUCTION OF CHLORINE DIOXIDE

[75] Inventor: Maria Norell, Sundsvall, Sweden

[73] Assignee: EKA Nobel AB, Surte, Sweden

[21] Appl. No.: 60,903

[22] Filed: Jun. 12, 1987

[30] Foreign Application Priority Data

Mar. 27, 1987 [SE] Sweden ............................ 8701291

[51] Int. Cl.$^4$ .............................................. C01B 11/02
[52] U.S. Cl. .................................................. 423/479
[58] Field of Search ................................. 423/479, 480

[56] References Cited

U.S. PATENT DOCUMENTS

| | | | |
|---|---|---|---|
| 2,736,636 | 2/1956 | Day et al. ............................ | 423/479 |
| 2,881,052 | 4/1959 | Julien et al. ......................... | 423/479 |
| 3,933,988 | 1/1976 | Rosen ................................... | 423/480 |
| 4,156,713 | 5/1979 | Fuller ................................... | 423/479 |
| 4,578,261 | 3/1986 | Lobley ................................. | 423/478 |

FOREIGN PATENT DOCUMENTS

2569677 3/1986 France ................................ 423/479
138858 1/1953 Sweden .

*Primary Examiner*—John Doll
*Assistant Examiner*—Jeffrey Edwin Russel
*Attorney, Agent, or Firm*—Burns, Doane, Swecker & Mathis

[57] ABSTRACT

The present invention relates to a process for production of chlorine dioxide from an alkali metal chlorate, a mineral acid and a volatile reducing agent. The process is carried out in a vessel operated under subatmospheric pressure, whereby water is evaporated and withdrawn together with chlorine dioxide and the alkali metal salt of the mineral acid is crystallized within the reaction vessel and withdrawn therefrom. According to the invention the utility of the volatile reducing agent is enhanced by the addition of the agent to the region of crystallization in the reaction vessel.

10 Claims, 1 Drawing Sheet

PROCESS FOR PRODUCTION OF CHLORINE DIOXIDE

The present invention relates to a process for production of chlorine dioxide from an alkali metal chlorate, a mineral acid and a volatile reducing agent. The process is carried out in a vessel operated under subatmospheric pressure, whereby water is evaporated and withdrawn together with chlorine dioxide and the alkali metal salt of the mineral acid is crystallized within the reaction vessel and withdrawn therefrom. According to the invention the utility of the volatile reducing agent is enhanced by the addition of the agent to the region of crystallization in the reaction vessel.

Chlorine dioxide used as an aqueous solution is of considerable commercial interest and importance, mainly in the area of pulp bleaching but also in water purification, fat bleaching, removal of phenols from industrial wastes, etc. It is therefore desirable to provide processes by which the chlorine dioxide can be efficiently produced.

The predominant chemical reaction involved in such processes is summarized by the formula $$ClO_3^- + Cl^- + 2H^+ \rightarrow ClO_2 + \tfrac{1}{2}Cl_2 + H_2O \qquad [1]$$

The chorate ions are provided by alkali metal chlorate, preferably sodium chlorate, the chloride ions by alkali metal chloride, preferably sodium chloride, or by hydrogen chloride, and the hydrogen ions by mineral acids, normally sulfuric acid and/or hydrochloric acid.

Processes for producing chlorine dioxide are set forth in, e.g., U.S. Pat. Nos. 3,563,702 and 3,864,456, which are hereby incorporated by reference, comprising continuously feeding to a single vessel generator-evaporator-crystallizer alkali metal chlorate, an alkali metal chloride and mineral acid solutions in proportions sufficient to gene-rate chlorine dioxide and chlorine, at a temperature of from about 50 to about 100 degrees centigrade, and an acidity of from about 2 to about 12 normal, with or without a catalyst, removing water by vacuum-induced evaporation at about 100–400 millimeters of mercury absolute, with concurrent withdrawal of chlorine dioxide and chlorine, crystallizing the salt of the mineral acid within the generator and withdrawing the crystals from the vessel.

In those reaction systems wherein the acid normality is maintained between about 2 and 4.8, the reaction may be carried out in the presence of a relatively small amount of a catalyst, such as those selected from the group consisting of vanadium pentoxide, silver ions, manganese ions, dichromate ions and arsenic ions.

In existing processes for production of $ClO_2$ there is often also a by-product $Cl_2$ formation, due to the use of chloride ions as reducing agents according to formula [1]

An additional small amount of chlorine is also produced by the side reaction according to the formula $$ClO_3^- + 6H^+ + 5Cl^- \rightarrow 3Cl_2 + 3H_2O \qquad [2]$$

This chlorine by-product has formerly been used as such in the paper mills as a bleaching agent in aqueous solution, or it has been reacted with sodium hydroxide to form sodium hypochlorite and used as a bleaching agent. Today there is a tendency towards a more extensive chlorine dioxide bleaching and thus a decreasing need for chlorine and hypochlorite as bleaching agents.

Another disadvantage with by-product chlorine is that the concentration of the chlorine solution is very low, normally 1–5 gpl. Because of the large amount of water, modern bleaching systems cannot use the by-product chlorine in the chlorination state. This means that many pulp mills consider the chlorine as a by-product of limited value.

Another process, described in copending U.S. Pat. No. 4,678,654, is based on the chemistry of reaction [1] combined with a subsequent reactor for conversion of $Cl_2$ to a mixed acid which can be recycled.

$$Cl_2 + SO_2 + 2H_2O \rightarrow 2HCl + H_2SO_4 \qquad [3]$$

This process has the advantages of high efficiency and reduced sodium sulfate by-product. Some small amounts of chlorine are produced since the absorption of $ClO_2$ from the reactor gas mixture of $ClO_2$, $Cl_2$ and $H_2O$ is not completely selective. Thus, it is normal to get 0.2–2.0 gpl $Cl_2$ or more frequently 1.0–1.8 gpl $Cl_2$ in the $ClO_2$ water.

It is also known to use other reducing agents which do not produce chlorine as a by-product. In U.S. Pat. No. 3,933,988 sulfur dioxide is used as reducing agent and in U.S. Pat. Nos. 4,081,520, 4,145,401, 4,465,658 and 4,473,540 methanol is used as reducing agent.

These reducing agents are volatile and are therefore easily desorbed due to the conditions in the reaction vessel where water is evaporized. The methanol utility, in a process as described in e.g. U.S. Pat. No. 4,465,658 is very low. The consumption of methanol is 190–200 kg per ton produced chlorine dioxide, whereas the theoretical amount is only 79 kg/ton, according to the formula $$6NaClO_3 + CH_3OH + 4H_2SO_4 \rightarrow 6ClO_2 + CO_2 + 5H_2O + 2Na_3H(SO_4)_2 \qquad [4]$$

Thus, only about 40% of the methanol charged is used efficiently in the existing processes.

A thorough study of the reaction products from processes of prior art reveals that part of the methonal charged leaves the reactor unreacted. This loss may be as high as 30 to 40% or 60–80 kg/ton $ClO_2$. This unreacted methanol will be absorbed in the $ClO_2$ water where it can react with $ClO_2$ and cause a loss in overall efficienty.

Another source of losses is inefficiencies in the methanol oxidation following the net reactions $$12NaClO_3 + 3CH_3OH + 8H_2SO_4 \rightarrow 12ClO_2 + 4Na_3H(SO_4)_2 + 3HCOOH + 9H_2O \qquad [5]$$

$$6NaClO_3 + 3CH_3OH + 4H_2SO_4 \rightarrow 6ClO_2 + 2Na_3H(SO_4)_2 + 3HCHO + 6H_2O \qquad [6]$$

These consume 120 and 240 kg methanol per ton of $ClO_2$ respectively.

Losses also result from inefficienty in $ClO_2$ formation according to the net reactions $$6NaClO_3 + 5CH_3OH + 4H_2SO_4 \rightarrow 3Cl_2 + 2Na_3H(SO_4)_2 + 5CO_2 + 13H_2O \qquad [7]$$

$$12NaClO_3 + 15CH_3OH + 8H_2SO_4 \rightarrow 6Cl_2 + 4Na_3H(SO_4)_2 + 15HCOOH + 21H_2O \qquad [8]$$

It should be noted that the reactions given above represent net reactions and that in most cases the true mechanisms involve several intermediate steps.

For example, the direct reactions with chlorate ions and methanol are very slow and the true reducing agent in this case is chloride ions reacting according to [1]. The chlorine formed is then reacting with methanol to regenerate chloride ions following the reaction

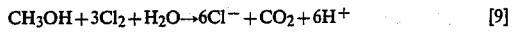  [9]

Thus, it is often necessary to add a small amount of chloride ions continuously in order to obtain a steady production.

The present invention provides a method for production of chlorine dioxide in which none or essentially no chlorine is formed and in which the efficiency of a volatile reducing agent is substantially increased in comparison with prior art.

The invention thus relates to a process as described in the accompanying claims.

According to the invention it has been found that methanol losses are strongly dependent on the mode of addition to the reactor. When a reactor was operated according to 1983 Pulping Conference Tappi Proceedings, page 632, with methanol feed at the same point as chlorate feed, i.e. before the heat exchanger, which is the normal feed point of reducing agents in existing processes, the methanol loss was 37%. When the same reactor was operated with methanol addition at a point within the body of the reactor according to the invention, the methanol content in the product gas mixture was analyzed and the loss calculated to 3%.

The invention relates to a process for production of chlorine dioxide by reacting in a reaction vessel an alkali metal chlorate, a mineral acid and a volatile reducing agent in proportions to generate chlorine dioxide in a reaction medium maintained at a temperature from about 50° C. to about 100° C. and subjected to a subatmospheric pressure sufficient to effect evaportion of water whereby a mixture of chloride dioxide and water vapor is withdrawn from an evaporation region in the reaction vessel and precipitation of an alkali metal salt from the mineral acid in a crystallization region in the reaction vessel wherein the volatile reducing agent is introduced in the crystallization region of the reaction vessel.

The chlorine dioxide generator can be separated into three main regions depending on the different physicochemical processes leading to chloride dioxide generation in a process using subatmospheric pressure for evaporation of water in order to dilute the chlorine dioxide leaving the reactor and in order to reduce the amount of water in the reactor for obtaining crystallization of the alkali metal salt of the mineral acid.

With reference to FIG. 1, which is a schematic view of a chlorine dioxide generator, the first region (A) is the region of heat exchange and is the volume between the feed point of chlorate solution and the feed point of acid. This region includes a heat exchanger where the reactants are heated to the desired reaction temperature. In the upper part the reaction medium is boiling.

The second region (B) is the region of evaporation and extends to the level in the reactor where boiling of the reaction medium ceases.

In region B the mineral acid can be fed to the hot chlorate rich solution. The heat of dilution of the acid will increase temperature further and together with the acidity increase the reactivity will increase strongly. In this region the chemical reaction according to formula [1] will also be the predominant process.

The water vapour formed will facilitate desorption of dissolved gas in the reaction liquid. For the conventional process, i.e. when chloride is used as reducing agent, this is beneficial since $ClO_2$ and $Cl_2$ are removed, so that the inhibiting effect of $Cl_2$ on $ClO_2$ formation is avoided and further loss reactions of $ClO_2$ in the solution are obviated. However, in the case of processes using volatile reducing agents, these will be desorbed by the water vapour to a large extent and thereby removed from the reactor.

Boiling occurs in the reaction medium when the sum of vapour pressure of water ($P_{H2O}$), $ClO_2$ and other volatile components ($\Sigma P_i$) in the liquid is equal to the total pressure ($P(Y)$), i.e. when $$P(Y) = P_{H2O} + \Sigma P_i \qquad [10]$$

The pressure in the generator will be essentially constant in the vapour phase but increases downward in the liquid phase (coordinate Y) due to the static pressure of gases, reactor liquid and crystals.

If $P_{TOT}$ denotes the pressure in the vapour phase and $P(Y)$ the pressure at a level Y in the liquid phase then $$P(Y) = P_{TOT} + \rho(Y)gY \qquad [11]$$

where
 $\rho(Y)$ = density of the three phase mixture of gas, liquid and solids.

In the evaporation region the pressure in the liquid phase increases with the square of the liquid depth (Y), whereas in the crystallization region C the pressure increases linearly with Y down to the lowest point in this region.

For a given temperature, gas phase pressure ($P_{TOT}$) and solids concentration the depth of the evaporation region can be calculated in known manner.

The third region (C) is the region of crystallization and is the volume of the reactor in which the liquid flow is directed essentially vertical down to the feed point of chlorate solution. Here crystals of sodium sulfate, sodium sesqui sulfate or sodium bisulfate will grow from nuclei formed by the reaction in the region B. The chlorine dioxide reaction may continue here, but crystal growth is the dominating process.

By the addition of the reducing agent in the crystallization region unnecessary desorption of the volatile reducing agent due to the evaporation conditions in the reactor is avoided. Since chlorine normally is desorbed in the region of evaporation it was surprising to find that the reaction medium in the region of crystallization still contained chlorine, in sufficient amounts to be reduced by the reducing agent to chloride ions according to [9]. These chloride ions are essential for the chlorine dioxide production according to [1].

It should be understood, that addition of the volatile reducing agent to the region of crystallization according to the invention should be interpreted so that erystallization is the predominant reaction in this part of the reaction vessel, but that of course a minor evaporation of the reaction medium can exist. Suitably the addition of the volatile reducing agent is carried out in the upper part of the crystallization region in order to obtain long contact time between the reducing agent and dissolved chlorine in the reaction medium.

The invention is applicable to processes with volatile reducing agents for the reduction of chlorine to chloride such as formaldehyde, methanol, ethanol, sulfur dioxide and other oxidizable organic or inorganic compounds. Methanol is the preferred reducing agent and is therefore referred to below.

The invention applies to suitably $ClO_2$ generation processes working in a wide range of acidity, suitably 2-11N.

When the acidity is in the range of 0.05 to 0.3N the mineral acid is preferably hydrochloric acid. At higher acidity sulfuric acid is preferably used, or a mixture of sulfuric acid and hydrochloric acid.

At low normality it is preferred to add a catalyst, such as those normally used in chlorine dioxide production. At normality ranges from about 5 up to below 7, there is no specific need for a catalyst, although production in some cases can be increased by using such. For many reasons it can be suitable to carry out the reaction in this range of normality. It is an advantage to avoid too high acidity in the reaction vessel, as this increases corrosion of the equipment or requires more corrosion resistant construction material which in turn increases costs. Another advantage by carrying out the reaction at this acidity range is that the precipitated salt of the mineral acid contains less coprecipitated acid values which otherwise must be neutralized before disposal or re-use at the paper mill.

Another advantage of low acidity operation occurs when a chlorate feed stream containing chromium is utilized. It is known that the tendency of $NaHSO_4$ formation is larger when chromium is present even at as low acidity as 8.5 N. Since the $NaHSO_4$ crystal contains 36% $H_2SO_4$ as compared to 18% $H_2SO_4$ in $Na_3H(SO_4)_2$ it is highly undesirable to obtain that crystal. Not only does the acid demand in the process increase, but there is also an increased need for caustic addition to the water or black liquor when dissolving the salf cake therein. If the black liquor is not kept alkaline enough, $H_2S$ can be released with a risk of fire or intoxication of the working environment.

The process is also easier to control due to less rapid reactions and it has been found that the risk of loss of chloride ions in the reaction medium and subsequent white outs is substantially reduced by operating in the low acid region.

At acidities above approximately 4.8 N up to appr. 11 N the crystals formed are needle shaped sodium sesquisulphate, $Na_3H(SO_4)_2$.

These tend to form clustered agglomerates which give a hard salt cake on the filter, increasing the problem to break off the washed cake for further handling.

It was surprisingly found that the shape of the needles was dependent on acidity and that the shorter needles obtained at low acidities were more easily separated on the filter since they did not form as hard a filter cake as did the longer needles obtained at high acidities.

A steady continuous filter operation is essential for the reliability of the total process of chlorine dioxide generation.

The filtration operation consists of several steps, all of which must function without disturbance:
formation of the salt cake
dewatering
washing
dewatering
release All these steps occur continuously in series on the quickly revolving filter.

The washing of the salt cake was more efficient in the case with short needles, since the long needles gave a more heterogeneous cake with increased channeling of the wash water. Also, the lower acidity led to a lower sulfuric acid contamination of the salt cake as seen by the example below.

The release of the salt cake from the filter is often made with a jet of air or steam or by the aid of a mechanical knife or scraper. In this step it was seen that the salt cake containing short needles was looser and more easily broken up and released compared to the harder salt cake obtained at high acidity.

A further advantage of the low acidity operation is that the smaller crystals dissolve more easily in the black liquor.

The reaction can also be carried out at acidity ranges above 7N and preferably up to about 10N. At high acid normality there is no need for using a catalyst for increasing the reactivity and the crystals are larger and easier to dewater on the filter.

Best results for the production of chlorine dioxide according to the invention are obtained by using sodium chlorate as alkali metal chlorate and sulfuric acid as mineral acid at an acidity of 5-11 N. Methanol is the preferred volatile reducing agent. It is suitable to operate the reaction vessel under a pressure of 60-400 mm Hg, preferably 90-200 mm Hg and at a temperature of 50°-90° C., preferably 60°-75° C. In order to avoid production losses during start up or rate changes it is suitable to add minor amounts of chloride ions, preferably as sodium chloride, in order to keep its concentration in the reactor normally in the range from 0.001 and up to 0.8 moles/L.

A further increase in methanol efficiency and also less chlorine formation are obtained if the region of reaction is moved to the body of the reactor, i.e. from B to C. The chlorine formed in the reaction [1] will then be released at the point of methanl addition and react fast according to [9] in a region where desorption is not competing as in region B.

In practice the reaction region is moved to the reactor body by changing the feed point of acid to this point.

The term "point of feeding" or "point of addition" used here does not implicate that the reactants are fed through a simple pipe at one single spot. On the contrary it is of advantage for this invention that the feed is made in a well distributed way. Thus, there can be one or several feed pipes in the reactor body each equipped with means for distribution of the feed into the reactor solution. These means can consist of porous or perforated pipes or plates, nozzles or the like.

Another secondary effect obtained by the invention is that the BOD (biological oxygen demand) in the bleaching effluent is 0.2-1 kg BOD per ton pulp lower when $ClO_2$ water according to the invention is used due to the reduced methanol content, compared to when $ClO_2$ water from traditional methanol processes is used for bleaching.

It has also been found that the oxidation of methanol to formic acid can be favoured by addition of small amounts of catalysts to the reactor. The active catalysts belong to the groups VB-VIIIB, IB, IVA and VIIA of the periodic table of the elements. The highest activity has been found for compounds containing V, Nb, Cr, Mn, Fe, Ru, Os, Co, Ni, Pd, Pt, Cu, Ag, Ge, Sn, Pb, Br or I either separate or in combinations.

Although the exact mechanism for the enhancement of efficiency of these catalysts has not been understood it is believed that they increase the reactivity of the complete oxidation of methanol to carbon dioxide. The amounts of catalyst needed to a significant increase in methanol efficiency vary with the type but is typically 2-1000 ppm.

Hereby the methanol utility is further increased and the consumption is reduced. Further more the formic acid content of the $ClO_2$-water is substantially reduced which has been shown to improve the stability of the water.

The invention is illustrated by the following examples:

EXAMPLE 1

A laboratory chlorine dioxide generator was operated at a production rate of 90 g $ClO_2$/h at a pressure of 90 mm Hg. A solution with 550 gpl $NaClO_3$ was continuously fed with 270 ml/h to the generator together with a small stream of 5M chloride so that the chloride concentration in the generator was 0.1M. Methanol was added as a 50 wt % solution in water at a feed rate of 25 ml/h and sulfuric acid was fed in 93 wt % concentration at a rate sufficient to keep an acidity of 9.5N in the generator. The chlorate, chloride and methanol were all added after the region of crystallization but before the heat exchanger and the sulfuric acid was fed after the heat exchanger.

A gas mixture of chlorine, chlorine dioxide, water vapour, methanol, carbon dioxide, formic acid and air left the reactor and was absorbed in cold water to give a chlorine dioxide water containing 8 gpl $ClO_2$ and 0.3 gpl $Cl_2$. The composition of the gas mixture was analyzed and showed a ratio of $CH_3OH$ to $ClO_2$ of 0.047 g/g i.e. 37% of the total methanol feed of 15.74 g/h or 0.17 g/g $ClO_2$ was lost. The chlorine production was 0.025 g/g $ClO_2$ and the ratio of carbon dioxide to formic acid was 0.32.

Crystals were continuously formed in the generator and periodically discharged to keep an essentially constant slurry density within the generator. Analysis of the dry crystals showed that they were sodium sesqui sulfate, $Na_3H(SO_4)_2$. The amount produced was 1.35 g/g $ClO_2$.

EXAMPLE 2

The same laboratory reactor as used in Example 1 was now modified to enable methanol addition in the region of crystallization in the reactor. In this case at a level of 0.5 m below the liquid surface the pressure and feed rates were equal to those used in example 1, and the height of the evaporative region could be calculated to 0.2 m.

Three different tests were carried out. In the first test the reactor was operated at 4.5N acidity with silver and manganese added as a catalyst to give a production rate of 90 g $ClO_2$/h. The crystals formed were $Na_2SO_4$ (s) and the amount was 1.10 g/g $ClO_2$.

In the second test the normality was raised to 6.5. The crystals formed were $Ha_3H(SO_4)_2$ (s) in an amount of 1.35 g/g $ClO_2$.

The third test was carried out at a normality of 9.5. Also here $Na_3H(SO_4)_2$ was formed, and the amount was 1.35 g/g $ClO_2$.

The produced gas mixture from all tests contained a ratio of $CH_3OH$ to $ClO_2$ of 0.004 g/g, i.e. only 3% of the methanol feed was lost. The same ratio of $CO_2$ to $HCOOH$ as in Example 1 was obtained in all three tests.

EXAMPLE 3

The same experiment as in Example 2 was preformed, but now with the use of a catalyst consisting mainly of $PbI_2$ in a concentration of 50 ppm.

The acidity in the reactor was 4.9 N and the feed concentrations and pressure the same as in Example 2. The methanol and chloride feed streams were added in the region of crystallization in the reactor as in Example 2.

The gas mixture produced contained a ratio of $CH_3OH$ to $ClO_2$ of 0.004 g/g, i.e. 3% of the methanol was lost. The ratio of $CO_2$ to $HCOOH$ was 1.27, i.e. the methanol was more efficiently converted to $CO_2$ in comparison with previous examples. The total methanol charge was thus 0.11 g/g $ClO_2$, only 63% of the amount used in Example 1 and only 69% of the amount used in Example 2. Since the formic acid contamination of the $ClO_2$ water was cut in half an increased stability was obtained.

I claim:

1. A process for the production of chlorine dioxide, comprising the steps of:
   reacting in a reaction vessel in alkali metal chlorate, a mineral acid and methanol in proportions to generate chlorine dioxide in a reaction medium, said reaction medium being maintained at a temperature of from about 50° C. to about 100° C. and under a subatmospheric pressure sufficient to effect evaporation of water;
   withdrawing a mixture of chlorine dioxide and water vapor from an evaporation region in said reaction vessel; and
   precipitating an alkali metal salt from said mineral acid in a crystallization region in said reaction vessel;
   wherein said methanol is introduced in the upper part of said crystallization region of said reaction vessel.

2. A process according to claim 1 wherein the mineral acid is sulfuric acid.

3. A process according to claim 1, wherein the acidity is from about 5 up to about 11N.

4. A process according to claim 1, wherein the alkali metal chlorate is sodium chlorate.

5. A process according to claim 1, wherein chloride is added to the reaction medium to keep a chloride concentration of from 0.001 and up to 0.8 mole chloride/l.

6. A process according to claim 2, wherein the acidity is from about 5 up to about 11N.

7. A process according to claim 3, wherein the acid normality is from about 5 up to 7N.

8. A process according to claim 6, wherein the acid normality is from about 5 up to 7N.

9. A process according to claim 1 wherein the chlorine dioxide production is carried out in the presence of at least one catalyst belonging to Groups VB-VIIIB, IB, IVA and VIIA of the Periodic Table.

10. A process according to claim 9 wherein the catalyst is a compound containing at least one of V, Nb, Cr, Mn, Fe, Ru, Os, Co, Ni, Pd, Pt, Cu, Ag, Ge, Sn, Pb, Br or I.

* * * * *

REEXAMINATION CERTIFICATE (1712th)
United States Patent [19]
Norell

[11] B1 4,770,868
[45] Certificate Issued Jun. 2, 1992

[54] PROCESS FOR THE PRODUCTION OF CHLORINE DIOXIDE

[75] Inventor: Maria Norell, Sundsvall, Sweden

[73] Assignee: Eka Nobel AG

Reexamination Request:
No. 90/002,520, Nov. 25, 1991

Reexamination Certificate for:
Patent No.: 4,770,868
Issued: Sep. 13, 1988
Appl. No.: 60,903
Filed: Jun. 12, 1987

[30] Foreign Application Priority Data

Mar. 27, 1987 [SE] Sweden .............................. 8701291

[51] Int. Cl.$^5$ .............................................. C01B 11/02
[52] U.S. Cl. .................................................... 423/479
[58] Field of Search ................................ 423/479, 480

[56] References Cited

U.S. PATENT DOCUMENTS

| | | | |
|---|---|---|---|
| 4,051,229 | 9/1977 | Isa et al. | 423/478 |
| 4,154,810 | 5/1979 | Isa et al. | 423/478 |
| 4,169,134 | 9/1979 | Isa et al. | 423/478 |
| 4,178,356 | 12/1979 | Shibuya et al. | 423/478 |
| 4,206,193 | 6/1980 | Partridge et al. | 423/478 |
| 4,421,730 | 12/1983 | Isa et al. | 423/478 |
| 4,473,540 | 9/1984 | Fredette | 423/479 |

FOREIGN PATENT DOCUMENTS 906732 8/1972 Canada .
969735 6/1975 Canada .

*Primary Examiner*—Jeffrey Edwin Russel

[57] ABSTRACT

The present invention relates to a process for production of chlorine dioxide from an alkali metal chlorate, a mineral acid and a volatile reducing agent. The process is carried out in a vessel operated under subatmospheric pressure, whereby water is evaporized and withdrawn together with chlorine dioxide and the alkali metal salt of the mineral acid is crystallized within the reaction vessel and withdrawn therefrom. According to the invention the utility of the volatile reducing agent is enhanced by the addition of the agent to the region of crystallization in the reaction vessel.

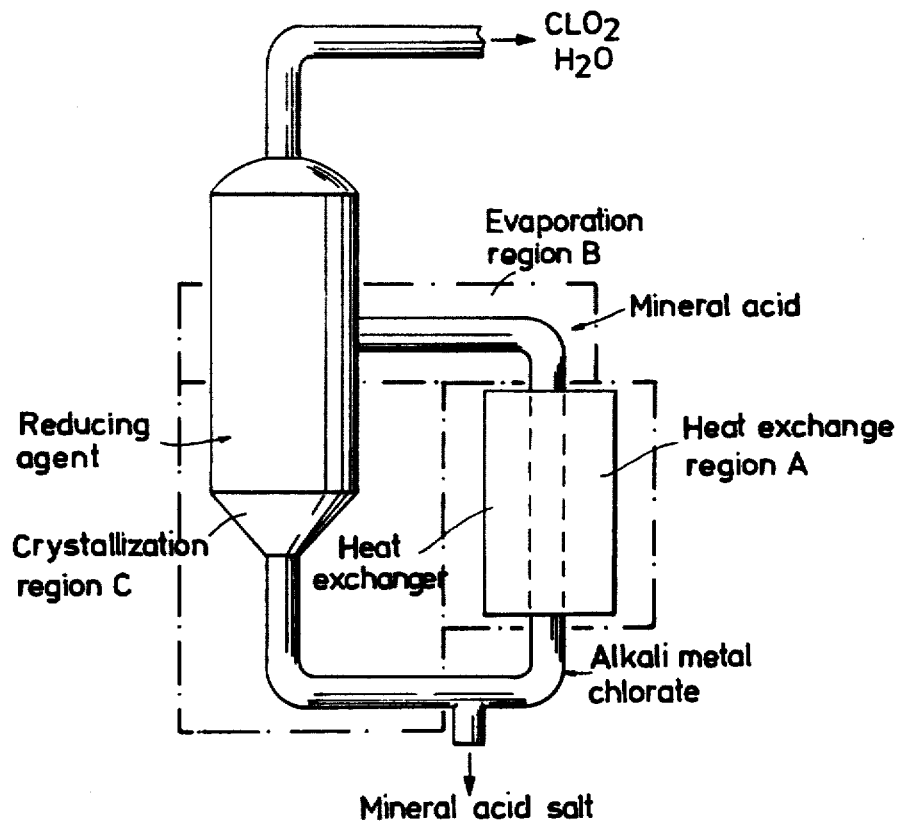

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-10 is confirmed.

\* \* \* \* \*